April 10, 1928.
H. W. SWEATT
UNIT HEATER CONTROL
Filed April 27, 1927
1,665,801
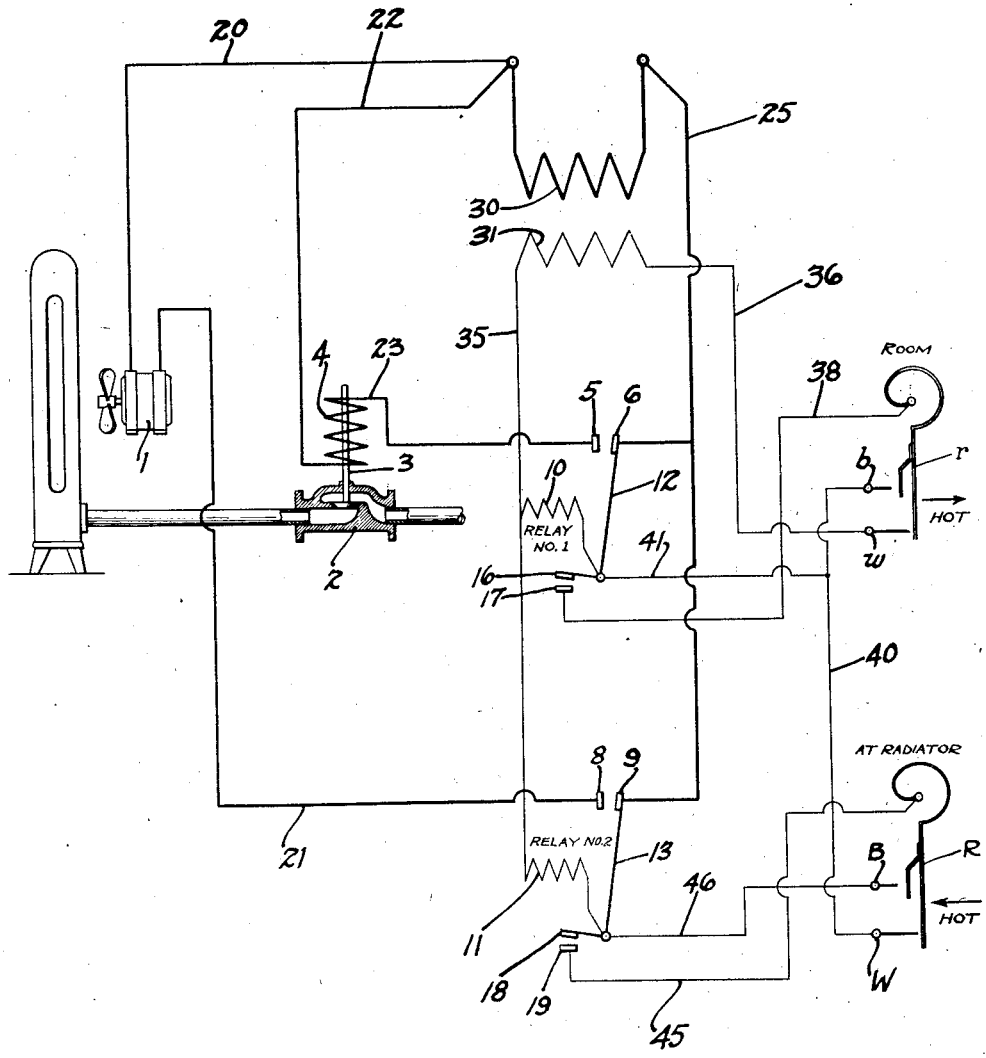
Inventor
HAROLD W. SWEATT
By Paul, Paul & Moore
ATTORNEYS Patented Apr. 10, 1928.

1,665,801

UNITED STATES PATENT OFFICE.

HAROLD W. SWEATT, OF MINNEAPOLIS, MINNESOTA, ASSIGNOR TO MINNEAPOLIS HEAT REGULATOR CO., OF MINNEAPOLIS, MINNESOTA, A CORPORATION OF MINNESOTA.

UNIT-HEATER CONTROL.

Application filed April 27, 1927. Serial No. 187,051.

This invention relates, generally to improvements in heat regulating devices and is particularly directed to the control of the circuit for a power driven fan, which fan is associated with a heating unit, such as a radiator, for the purpose of circulating air, heated by the radiator.

In the usual systems in which the fan of a unit heater is controlled by a room thermostat, it happens that the fan is frequently operated when the radiators or heaters are cold. Inasmuch as these heaters are sometimes arranged adjacent the outer wall of a building and, inasmuch as conduits are often provided so that cold outside air may be delivered to the radiator, operation of the fan when the radiator is cold would result in a cold draft being forced into the building, or the fan would create a cold draft which is also undesirable. Moreover, in hot water systems, or in steam systems in which the drainage is imperfect, it may happen that if the fan starts at a time when there is no heat in a radiator, the water of condensation may be frozen which might result and sometimes does result in cracking of the radiator. Also under these conditions, when thawing takes place, a considerable amount of damage may be done by leaking water.

The main object of the invention is to provide means which will obtain and allow operation of the fan as a result of temperature fluctuations in a room, only when the heater has reached a predetermined temperature. Another object is to provide in conjunction with the above mentioned means, additional means for opening and closing, for example, a radiator valve or equivalent means, for controlling a supply line to the heater and, therefore, heater temperature, accordingly as the heater or heating unit is not or is at the desired temperature.

Features of the invention include the broad idea of controlling the fan of a unit heater in a manner to positively prevent running of the fan when the heater is cold, along with the detailed arrangement of the elements of the apparatus for obtaining the results set forth herein.

The drawing diagrammatically represents the system.

To show one application of the invention, the following construction is illustrated:

The fan motor is indicated at 1 and this motor is supposedly arranged in such relation to a radiator that the fan acts, under normal conditions, to disseminate the heated air. An ordinary type of magnetically controlled valve is shown at 2. 3 is the valve stem and 4 is a coil controlling the valve stem. A relay, sometimes hereinafter referred to as relay No. 1, controls high voltage current to the coil 4 through contacts 5—6. The other relay, hereinafter sometimes referred to as relay No. 2, controls high voltage current to the motor through contacts 8 and 9. The relay coil for relay No. 1 is designated 10 and the relay coil for relay No. 2 is designated 11. The armature for relay No. 1 is designated 12, and the armature for relay No. 2 is designated 13. The armature for relay No. 1 controls current across contacts 16—17, and the armature 13, of relay No. 2, controls the current across the contacts 18—19. When relay No. 1 closes, 5, 6 and 16, 17 make. When relay No. 2 closes, 8, 9 and 18, 19 make.

Conductor 20 connects one side of the motor with the main line and, conductor 21 connects the other side of the motor with contact 8. Conductor 22 connects one side of the main line with one side of the valve coil 4, and conductor 23 connects the other side of the coil with contact 5. Conductor 25 connects the opposite side of the main line with contacts 6 and 9 of the relays. The relay control circuit is operable from the low voltage side of a transformer, the primary side of which is indicated at 30 and the secondary side at 31. One side of the secondary 31 is connected by wire 35 with coils 10 and 11 of the relays. The oppposite side of the secondary 31 is connected by a conductor 36 with contact $w$ of the room thermostat, or room device, responsive to control a circuit as a result of temperature fluctuations in a room. The letter $r$ represents the bimetallic or other equivalent heat responsive element of a room thermostat. This element is connected by the conductor 38 with the contact 17. The equivalent heat or pressure responsive device such as a hydrostat or pressurestat, located at the radiator, is designated R, and represents a radiator device responsive to control a circuit as a result of temperature fluctuations at the heater. The contacts with which this member cooperates are indicated respectively at W and B. The contacts $b$ and W are connected by conductor 40 and, this conductor is connected with the contact 16 and coil 10 by a conductor 41. Element R of the heater device is connected by conductor 45 with contact 19 and, contact B of the same device is connected by conductor 46 with contact 18 and with coil 11.

Before describing the operation of the device, it is to be known that there are what may be termed three positions of the mechanism. The first may be referred to as the "on" position, in which the room is sufficiently cold, to have obtained opening of the radiator valve, and in which the radiator is sufficiently warm to have obtained a closed circuit to the fan motor. In the "off" position the room is sufficiently warm, the valve is closed, the radiator is sufficiently cold, so that the fan is not running. In the "intermediate" position the room is sufficiently cold, the valve is open, the radiator is cold and the fan will not be running. Thus if the room thermostat closes as a result of a cold room, and if radiator is cold, the fan will stop running, but the valve will be open to furnish heat to the radiator.

It will be noted that in this embodiment of the invention, the room device closes the circuit to the valve when sufficiently cold, while the radiator device closes a circuit to the fan motor when sufficiently hot.

Operation.

Let it be assumed that the apparatus is in "off" position in which the valve is closed and the fan is not running, and both relays are, therefore, open. Under these conditions as the room thermostat cools sufficiently by movement toward the left, relay No. 1 will close when r—b make, (first by contacting at r—w, and subsequently at r, b). The result of these contacts is that the valve opens (contact at r, w are the holding contacts, and are first to close and last to open). When r, b make, the circuit is also conditioned to allow passage of current for closing relay No. 2 if and when the hydrostat makes at R, B. The result of this contact at R, B, under these conditions is that the motor starts, because there is a call for heat at the radiator. (Contacts R, W, are the holding contacts and are first to close and last to open. The reverse is true of contacts r, b and R, B, which close last and open first).

In the "on" position two things may happen: (1)—If the room thermostat breaks at r, w, due to a sufficiently warm room both relays will open or drop out because the room thermostat dominates control of the circuit to the relay coils. When both relays open, the valve closes and the motor stops. (2)— If the radiator cools while the room thermostat is still sufficiently cool, to maintain contact at r, b, relay No. 2 will open to shut off the motor. When the steam comes on or when the radiator is sufficiently hot, the hydrostat will make first at R, W, then at R, B, relay No. 2 will pull in or close, and the motor will start. While both relays are closed, r, w and R, W, constitute the holding contacts. It is to be noted that the room thermostat controls both the valve and the motor circuits, or in other words both relays, while the hydrostat controls only the motor circuit, or relay No. 2 and its control of this motor circuit is subordinate to the room thermostat control. Thus the room thermostat controls the valve, and the making of the motor circuit through relay No. 2.

I claim as my invention:

1. In combination a heater and a fan motor there-adjacent, magnetically operable means for controlling the heater temperature, a device responsive to control a circuit as a result of temperature fluctuations at the heater, a device responsive to control a circuit as the result of temperature fluctuations in the room, a first relay controlled by the room device for in turn controlling the magnetically operable means and also for controlling a power circuit to the room device, a second relay controlled by the room device and by the heater device, said second relay in turn controlling the motor and power circuit to the heater device, and circuit connections for the magnetically operable means, motor, relay, and room and radiator devices, arranged to obtain actuation of said magnetically operable means to supply heat when the room is sufficiently cool.

2. In combination a heater and a fan motor there-adjacent, magnetically operable means for controlling the heater temperature, a device responsive to control a circuit as a result of temperature fluctuations at the heater, a device responsive to control a circuit as a result of temperature fluctuations in the room, a first relay controlled by the room device for in turn controlling the magnetically operable means, and also for controlling a power circuit to the room device, a second relay controlled by the room device and by the heater device, said second relay in turn controlling the motor and power circuit to the heater device, and circuit connections for the magnetically operable means, motor, relay, and room and radiator devices, said connections arranged to start the motor only when the heater is sufficiently warm.

3. In combination a heater and a fan motor there-adjacent, magnetically operable means for controlling the heater temperature, a device responsive to control a circuit as a result of temperature fluctuations at the heater, a device responsive to control a circuit as the result of temperature fluctuations in the room, a first relay controlled by the room device for in turn controlling the magnetically operable means and also for controlling a power circuit to the room device, a second relay controlled by the room device and by the heater device, said second relay in turn controlling the motor and power circuit to the heater device, and circuit connections to the magnetically operable means, motor, relay, and room and radiator devices, said connections arranged to obtain actuation of said magnetically operable means to supply heat when the room is sufficiently cool and further arranged to cause the motor to start only when the heater is sufficiently warm.

4. In combination a heater and a fan motor there-adjacent, magnetically operable means for controlling the heater temperature, a device responsive to control a circuit as a result of temperature fluctuations at the heater, a device responsive to control a circuit as the result of temperature fluctuations in the room, a first relay controlled by the room device for in turn controlling the magnetically operable means and also for controlling a power circuit to the room device, a second relay controlled by the room device and by the heater device, said second relay in turn controlling the motor and power circuit to the heater device, and circuit connections for the magnetically operable means, motor, relay and room and radiator devices, said connections arranged to obtain actuation of said magnetically operable means to supply heat when the room is sufficiently cool and further arranged to cause the motor to start only when the heater is sufficiently warm the arrangement further being such that the room device dominates control by the heater device.

In witness whereof, I have hereunto set my hand this 21st day of April, 1927.

HAROLD W. SWEATT.